Nov. 17, 1936.  J. W. MORSE ET AL  2,061,326
AUTOMOBILE WHEEL ALIGNING APPARATUS
Filed Sept. 17, 1934  10 Sheets-Sheet 1
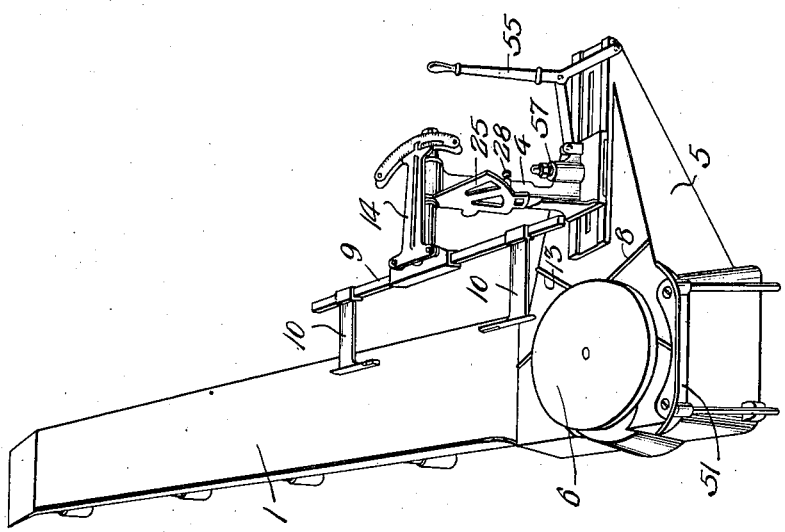
Fig. 1.
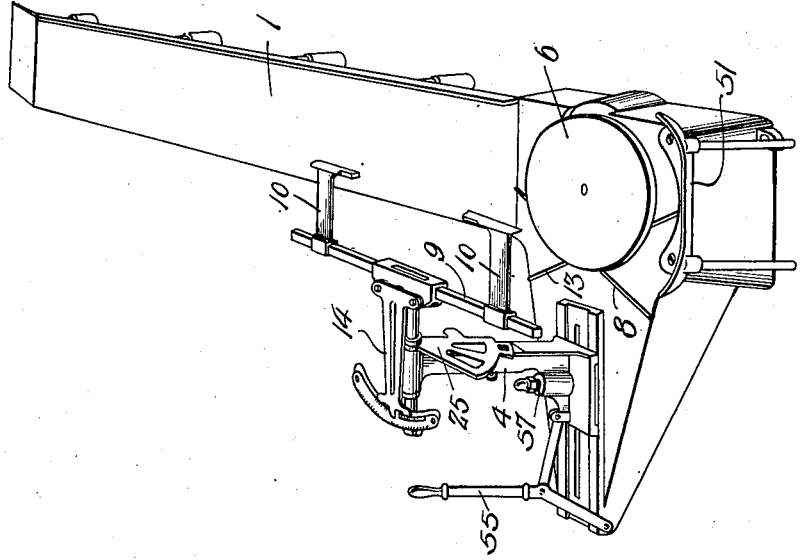
Inventor
James W. Morse
Charles S. Phillips
By  H. H. Graham
Attorney Nov. 17, 1936.  J. W. MORSE ET AL  2,061,326
AUTOMOBILE WHEEL ALIGNING APPARATUS
Filed Sept. 17, 1934   10 Sheets-Sheet 3
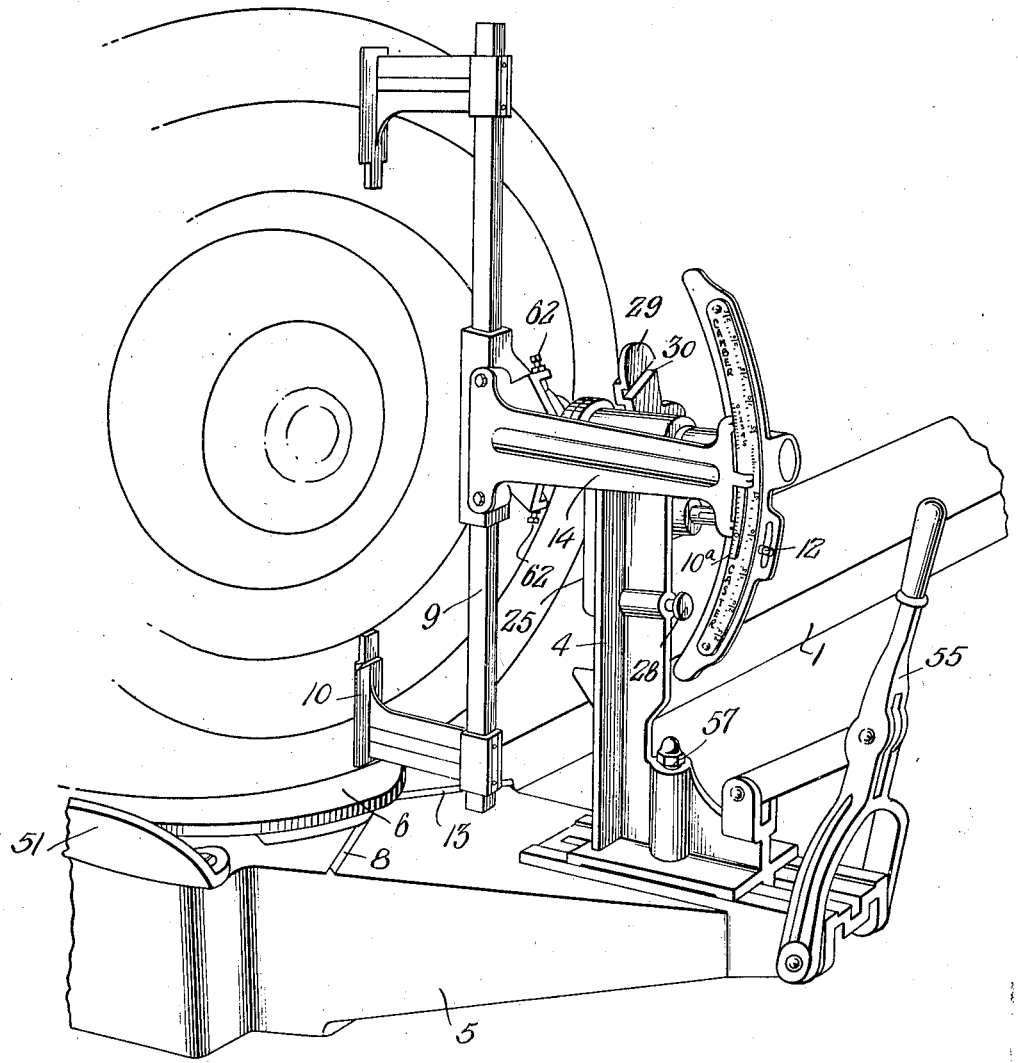
Fig. 3.

Nov. 17, 1936.    J. W. MORSE ET AL    2,061,326
AUTOMOBILE WHEEL ALIGNING APPARATUS
Filed Sept. 17, 1934    10 Sheets-Sheet 4

Inventor
James W. Morse
Charles S. Phillips
By
Graham
Attorney

Nov. 17, 1936.  J. W. MORSE ET AL  2,061,326
AUTOMOBILE WHEEL ALIGNING APPARATUS
Filed Sept. 17, 1934  10 Sheets-Sheet 5

Nov. 17, 1936.   J. W. MORSE ET AL   2,061,326
AUTOMOBILE WHEEL ALIGNING APPARATUS
Filed Sept. 17, 1934   10 Sheets-Sheet 7

Nov. 17, 1936.  J. W. MORSE ET AL  2,061,326
AUTOMOBILE WHEEL ALIGNING APPARATUS
Filed Sept. 17, 1934   10 Sheets-Sheet 8

INVENTOR
James W. Morse,
BY Charles S. Phillips
ATTORNEY

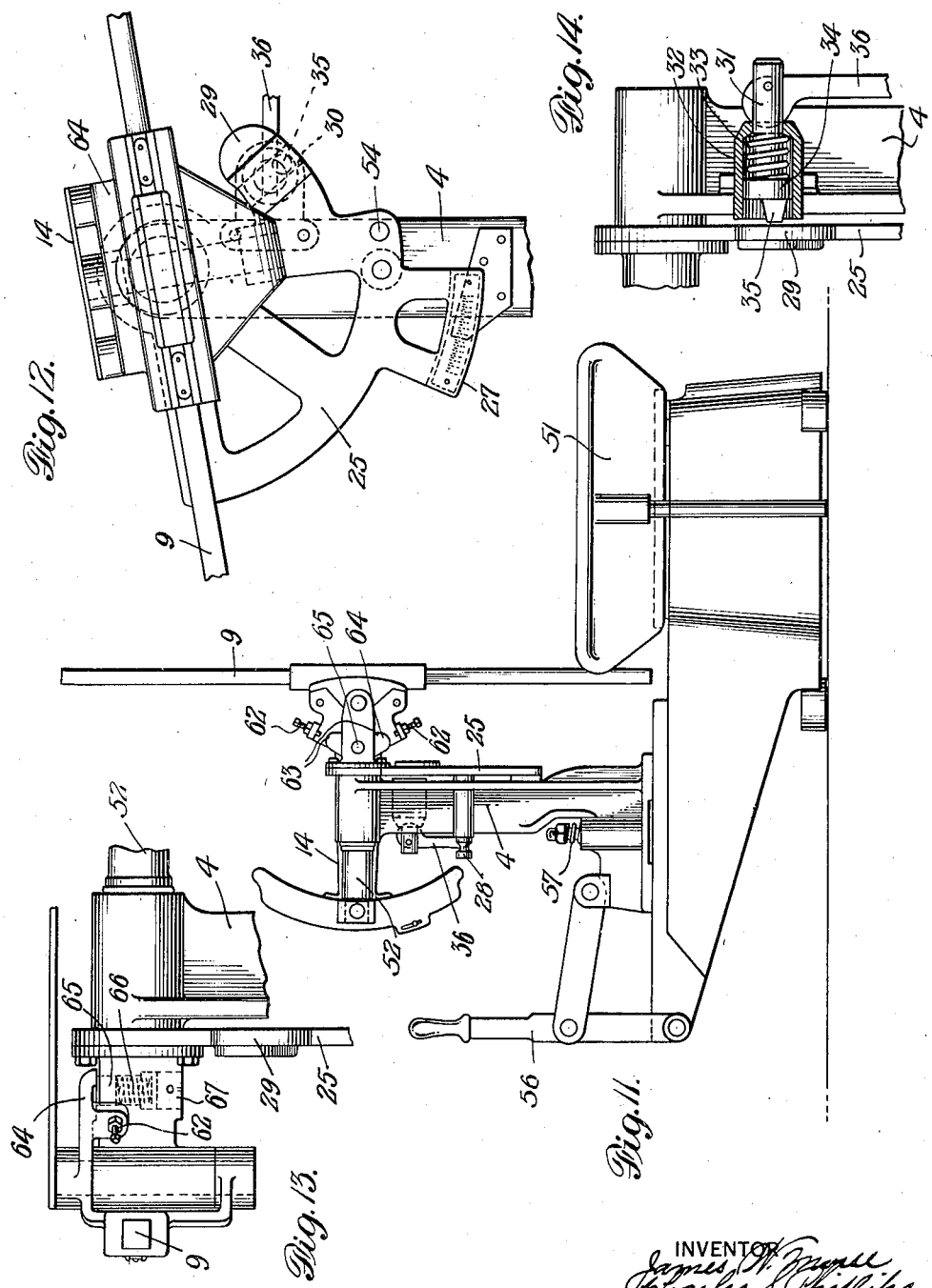

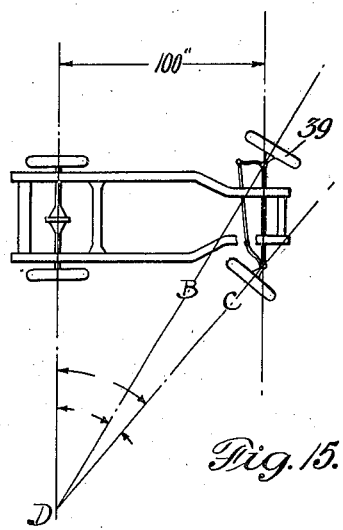
Fig. 15.
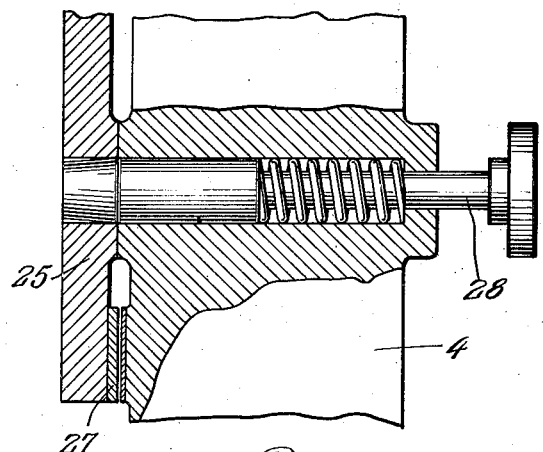
Fig. 18.
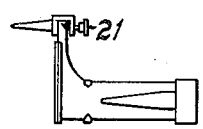
Fig. 19.
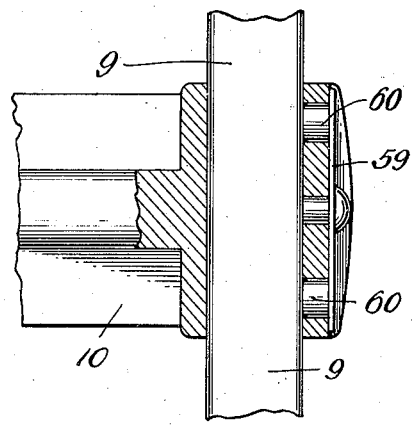
Fig. 20.
Fig. 17.
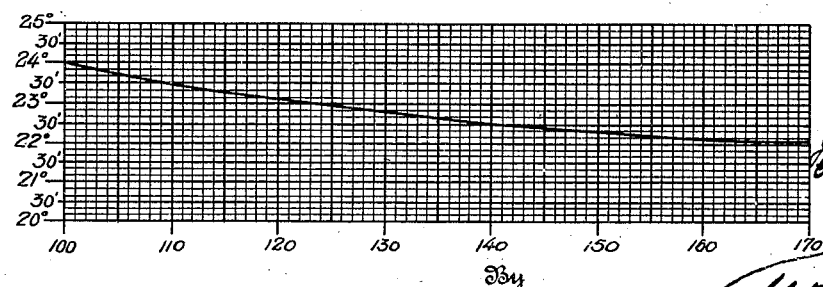

Patented Nov. 17, 1936

2,061,326

UNITED STATES PATENT OFFICE 2,061,326

AUTOMOBILE WHEEL ALIGNING APPARATUS

James W. Morse and Charles S. Phillips, Lansing, Mich., assignors to Food Machinery Corporation, San Jose, Calif., a corporation of Delaware Application September 17, 1934, Serial No. 744,420

32 Claims. (Cl. 33—203)

This invention relates to an apparatus for measuring the alignment characteristics of automobile wheels and is particularly adapted to the checking and testing of camber, caster, king-pin inclination, toe-in and toe-out on the turns or steering geometry and is adapted to check the individual angles of these several adjustments through the medium of a single unitary apparatus when applied to the wheels under proper testing conditions.

Before beginning the checking and testing of automobile wheels, their alignments and adjustments, it is necessary that certain standard conditions be established so that the tests when completed will indicate accurate and consistent results.

There are two principal factors relating to the checking and correcting of the front end of an automobile that are sometimes disregarded by those who are not fully familiar with the interrelationship of the various front end settings. These factors are, checking with the weight of the car on the wheels, and having the car level when these checks are being made. It has been proven that these factors must be included in the checking operations, otherwise the relationship of camber, caster, toe-in and so forth will not be in proper accord. There is an exception to the condition of always having the weight of the car on the wheels during the checking which will be referred to later.

There are other conditions that must be looked into before a checking of the front wheels of an automobile can safely be undertaken. Wear and play in the bearing or bushings, also axle spring or sag, and there is always some, allows the wheels to take one position when carrying the weight of the car and a different position when the weight of the car is off the wheels, therefore, it is almost always essential that the weight of the car be on the wheels when measurements and checks are being made, because we are trying to correct the front end so that the car will operate properly on the road.

The accurate leveling of the car is a condition that is taken care of in the installation of the apparatus, which is carefully leveled as installed and remains in that condition indefinitely without further attention, except from abuse or misuse during the operations of testing and checking the alignments of automobile wheels.

Another factor that is important is that the tires must be inflated to a proper predetermined pressure to insure a proper leveling of the car axle, and since in making some of the tests, the bulge of the tires at the ground is utilized, and some of the tests are made on the sides of the tires, it is necessary that the full weight of the car is on the tires to permit of accurate and consistent results being obtained.

The front wheels of automobiles have alignments and adjustments including caster, camber, toe-in on the straight ahead and toe-out or steering geometry on the curves or turns, and king-pin inclination, and since it has been found that the best results are obtained in the testing of these alignments with the weight of the entire car on the wheels, provision has been made in this apparatus to so rest the wheels that no possible binding or twisting will occur when and while the tests are being made, or when the adjustments are being changed to accord with predetermined practice.

When a car is placed on the apparatus of this application all checking and correcting of camber, caster, king-pin inclination, toe-in on the straight ahead and toe-out on the turns is completed without moving the car or changing its position which is vital to a correct diagnosis of correction of the adjustments if any are found necessary.

Heretofore it has been impractical to make checks and tests for wheel alignment with the weight of the car on the wheels because of the possibility of the wheels binding where resting on the supporting surfaces when the desired adjustments were made, without thereafter moving the car back and forth to relieve the binding. This moving of the car so changed the original position of the car relative to the checking apparatus that the next check did not coincide with the previous check and as a result of this condition certain tolerances were permitted that removed all possibility of ever having the alignments in perfect adjustment.

The present device obviates this difficulty entirely. All adjustments and changes can now be made without moving the car at all.

In order to have a clear understanding of the several alignments and adjustments necessary in front wheel aligning in automobiles it might be well to briefly state here just the exact meaning of these conditions.

*Caster.*—This is the amount in degrees of the backward tilt of the axle and king-pin.

*Camber.*—This is the amount in inches or degrees that the front wheels are tilted outward at the top.

*King-pin inclination.*—This is the amount in degrees that the tops of the king-pins are inclined toward the center of the car.

*Toe-in.*—This is an adjustment whereby the distance between the front wheels is less at the front than it is at the rear.

*Toe-out.*—Steering geometry, is the mechanics of keeping the front wheels in relative alignment as they are turned right or left. When driving on a curve the wheels go into a toe-out position, further apart at the front of the tires than they are at the back of the tires. This increases with the increase of the turn and varies with the wheelbase of the car.

A car without caster, that is with king pin vertical, would lack steering ability and would tend to wander over the road unless stability were provided by means of king-pin inclination.

Unequal caster in the two front wheels shows itself in a tendency of the car to pull itself to the right or left. This condition comes about through the axle having been twisted so that there is a greater amount of caster in one king-pin than in the other. The direction in which the car will tend to pull is away from the wheel with the most caster.

Axles with negative caster result in a car that is difficult to steer, that tends to shoot to the right or left and will turn a corner easily but is hard to straighten out at the end of the curve.

The need for camber in a car is principally due to the type of front axle used in automobiles. The weight of the front end of the car is carried on an axle that has a joint or pivot inside of where the wheels rest on the ground. The result of this is the tendency of the wheel to fall or tip inward at the top, putting a severe twisting strain on the pivot, which is the king-pin, which makes steering hard and might be dangerous if some means were not taken to off-set it. The remedy which was devised was to bring the point where the wheels rest on the road, in an axial line with the king-pin by tilting the top of the wheel out from the vertical and consequently in at the bottom. By this deviation of the wheel from the vertical it has become possible for the wheel to run in an approximately balanced freedom on a short spindle shaft, supported only at the inner end, the outer bearing being used only to take up thrust. This was considered a perfect camber setting under old conditions of high pressure tires and vertical king-pins. The downward pull of the car's weight was exerted lengthwise of the king-pin, that is straight down, the load being carried on the king-pin thrust bearings, and there was little or no side strain on the pin itself.

With the coming of the balloon tire, a new situation developed that required an almost complete redesigning of the front axle assembly.

When it became evident that any considerable amount of camber was ruinous to the front wheel balloon tires, many of the car manufacturers reduced the camber on their cars, but in doing this it also became necessary to devise some means of avoiding the shearing twist on the king-pins. The solution was to tilt the king-pin inward from the vertical, to give them inclination, thus came king-pin inclination.

King-pin inclination tends to keep the wheel spindles pointed outward in line with the axle, just as caster tends to keep the wheels pointed straight ahead. The effect is the same, since if the spindles are kept pointing out at right angles to the car, the wheels will, as a result, be kept pointing ahead.

Toe-in is a necessity growing out of camber and directly related to it. It might seem since the wheels are headed inward toward the center of the road, while actually traveling a parallel course, that there must be a constant grinding of their treads on the road surfaces. It appears that they are being held apart constantly by the axle against their tendency to roll inward to the same point. As a matter of fact, it is to avoid this tire wearing surface grind that toe-in is employed. Without it, if the wheels are cambered, tires would be quickly worn out by the road surface grind. A tire on the cambered wheel compresses more by the road contact on the outer side than on the inner side tends to constantly curve outward. By toeing the wheels inward this tendency is overcome and road surface friction is reduced to the lowest possible point. Toe-in must be adjusted in accordance with the amount of camber. High camber requires high toe-in. Low camber requires low toe-in.

Toe-out on turns, (steering geometry) is necessary because of the pivots in the axle just inside the wheels. The front wheels of a car when making a turn are not on the same line radius drawn from the center around which the car is turning, and because of this, it is necessary for the wheels to assume a toed-out position.

The importance of the wheels being in proper alignment on the turns can scarcely be overemphasized. When it is considered that fully 60 per cent of the car's travel is done with the wheels turned more or less from a straight ahead position, especially in city driving, it is easy to understand how absurd is the practice of merely lining up the wheels with a toe-in gauge for straight ahead travel and give no consideration to their position on the curves.

When a car is going around a curve the centrifugal force throws the weight of the car on the outside wheel, the car, therefore, travels in a curve governed by the outside wheel, and the inside wheel, due to improper toe-out adjustment, having been turned beyond or short of its proper position, is forced into a side drag that causes extremely rapid tire wear. This condition is sometimes so severe that a distinct whistle or squeal is heard when the car rounds a curve at high speed, caused by the grinding of the road surface against the tire tread.

The wheels of any car, if properly set on the curves, will be at right angles to the radius line from the center around which the vehicle is turning.

For example, a car with a hundred inch wheel base and the outside wheel turned twenty degrees to the left from a straight ahead position, the inside wheel must turn an additional four degrees to assume its proper relative position. The greater number of degrees that the inside wheel must turn, as compared with the outside wheel depends on the length of the wheelbase of the car.

The mechanical means used to give the inside wheel, left or right, a greater degree of turn on the curves is the setting of the spindles or plane arms at an angle instead of straight back.

The foregoing explanation of the several necessary adjustments for proper wheel alignment prepares the reader's mind for a full understanding of the necessity of extremely accurate and dependable devices and methods of checking and testing these alignments and adjustments, so that we may now pass to a consideration of the invention disclosed in this application that has been developed to attain the necessarily accurate determinations in actual practice.

Described briefly, the apparatus disclosed in this application comprises runways onto which the car to be tested is driven, the runways being leveled when installed which makes this a constant factor during the tests. Ball bearing turntables are located at the front end of the runways to form supports for the front wheels of the car during the tests. These turntables have a universal movement and are self centering, or are easily centered to the wheels by hand as the wheels are rolled thereon. The universal movement permits of swinging the front wheels through the desired arcs for testing without in any manner changing the position of the car after it is once properly positioned.

The tests and checks are made by a proper manipulation of the devices mounted on the front ends of the runways, one for each front wheel, and due to the fact that the car proper is not moved in any manner during the tests, changes and corrections may be made and rechecked with the assurance that the results indicated by the readings on the testing devices will be accurate. Only the swinging of the front wheels and occasional turning on their axes are necessary with this device to accurately check all of the conditions mentioned. If it becomes necessary to bend the axle, change wheel spindles or change the position of the axle relative to the springs these changes may be made and the work checked as it progresses so that final determinations and results may be depended upon.

It is an object of the invention to provide an apparatus for checking the alignment of automobile wheels while the entire weight of the car is supported by the wheels during the checking thereof.

It is a further object of the invention to provide an apparatus for the purpose specified wherein the front wheels of the car will rest on self aligning anti-friction supports while the several checks and adjustments are being made.

It is also an object of the invention to provide an apparatus for checking and correcting the alignment of automobile wheels wherein the checking may be made either against the tire sides or against the wheel felloes.

It is a further object of the invention to provide a front wheel aligning and checking device having means for leveling and adjusting the apparatus during installation or at any time thereafter.

It is also an object of the invention to provide an apparatus of the type described for checking and correcting the king-pin inclination of automobile front wheels and axles by a new and improved method.

It is also an object of the invention to provide an apparatus for checking the caster of front automobile wheels through an adjustable caster scale which permits direct reading of the caster angle and thus eliminates subtraction methods.

It is a further object of the invention to provide an apparatus for testing and checking the alignment characteristics of automobile wheels wherein the testing devices may be adjusted to a wheel and remain in such adjustment while any misalignment is being corrected so that the operator may at all times see just exactly how much or how little is the change in adjustment being made.

It is also an object of the invention to provide in an alignment testing apparatus for automobile wheels, centering devices for supporting the front wheels that will be universally adjustable in any direction as the wheels are being swung during the determinations of the various tests.

It is a further object of the invention to provide in an automobile wheel aligning apparatus, means for accurately and easily setting the device for the determination of the various tests and to accurately hold the device in its various positions and replace it in the predetermined positions during the tests.

With such objects in view as well as other advantages inherent in the invention, the novel structural peculiarities, novel organization of elements, and the separate and collective operations involved in carrying out the recited objects of the invention, which will be made the subject matter of claims, it is to be understood that the several necessary elements and combinations constituting the same may be varied somewhat in their proportions, placement, general arrangement and operative relation without departing from the scope and nature of the invention. In carrying out the objects of the invention in a concrete form or apparatus, further objects, advantages and improvements have been evolved than have been recited, and in order to make the invention more clearly understood, there are shown in the accompanying drawings means and mechanism embodying the preferred disposition of the different parts and combinations, in which has been illustrated one way of embodying the creative part or concept of the invention. The described devices are simply embodiments of the invention which other structures might also employ, and some of the parts and combinations may be used without the others in different types of such apparatus without departing from the purview of the invention so that applicants consider themselves entitled to such variations from the described and shown devices as may fall within the scope and meaning of the claims.

In the drawings accompanying the application there may be found instances where the parts are not drawn to scale and may even be exaggerated in size to more clearly show the parts in their relation to other parts and to more clearly illustrate the various operations, and in some instances the drawings may be only diagrammatic forms to illustrate some part or operation more clearly. Reference now being had to the drawings:

Figure 1 is a front end elevation of a complete unit in perspective and shows quite clearly the general relation of the various parts constituting the same.

Figure 3 is a companion view to Figure 2 and shows the wheel turned to the other position for the determination of "caster".

Figure 11 is a side elevation of one of the testing elements positioned on the base member and showing the testing bar in a vertical position, as well as other details of structure.

Figure 12 is an enlarged detail elevation showing the adjusting devices used for setting the testing bars when taking "king-pin inclination" readings.

Figure 13 is a detail view showing certain structural features.

Figure 14 is another detail view showing the structure of the adjusting device used when making "king-pin inclination", tests.

Figure 15 is a diagrammatic view showing the positions and relation of the front wheels relative to the center of the turning radius when turning a corner which clearly illustrates the need for "toe-out" on the curves.

Figure 16 is an enlarged plan view partly in section to illustrate the scale member and structural features thereof.

Figure 17 shows a "toe-out" or steering geometry chart used in determining the proper "toe-out" for the wheels of an automobile according to the wheel base dimensions of the car.

Figure 18 is a detail of the stop pin and construction that is used in locking the aligning device with test bar in vertical or horizontal position.

Figure 19 shows a felloe pin attached to a tire contact shoe which is used for checking against the rim or felloe instead of the side of the tire. It may also be clamped directly to the bar if desired.

Figure 20 is a structural detail relating to a manner of frictionally holding the slide bar in any desired position of axial adjustment.

Figure 2:
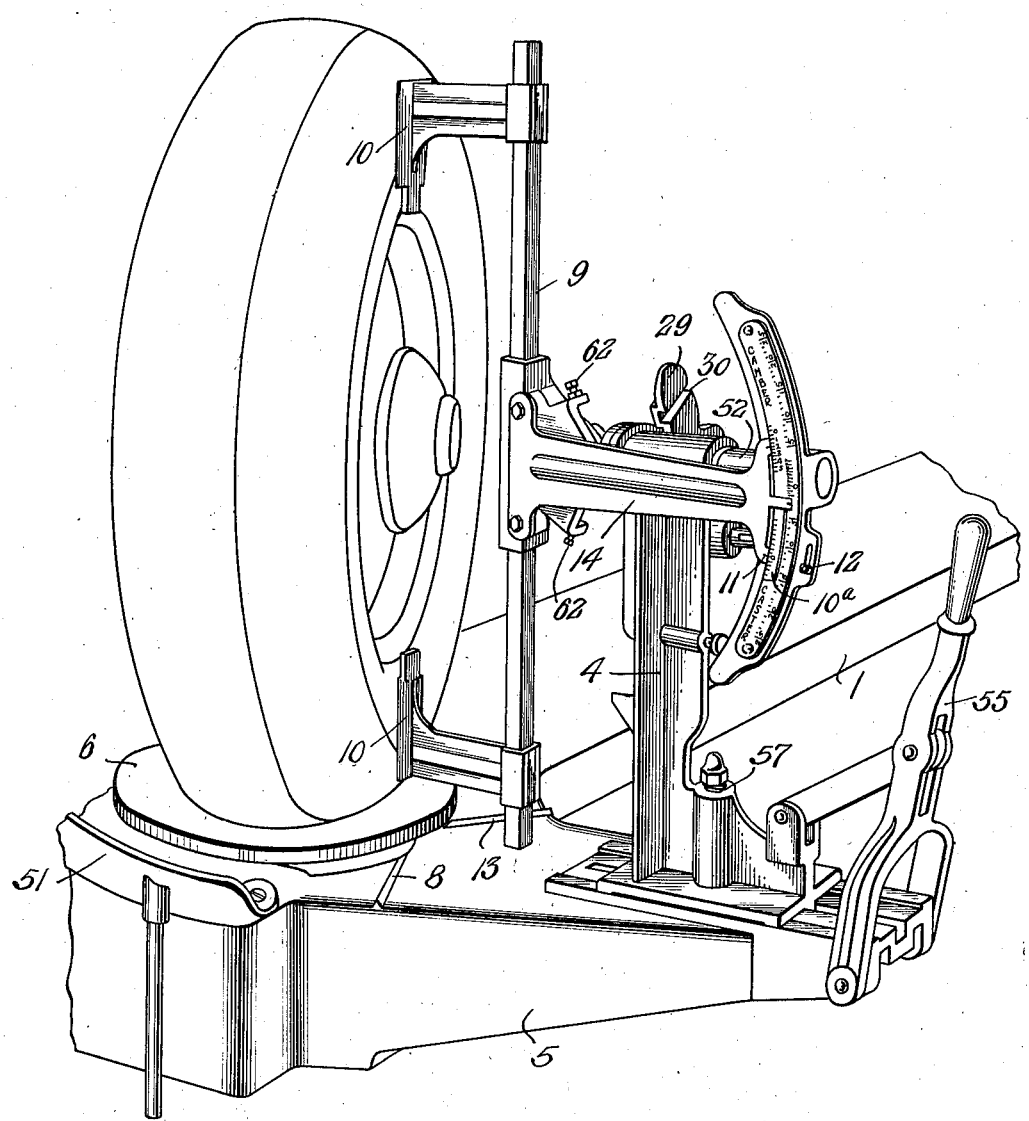
Figure 2 is an enlarged detail view of the front end of the right hand testing element when facing the front end of the car and shows it adjusted to one angle for the determination of "caster".

The general construction of the complete testing unit as disclosed by the drawings comprises the side runway members 1 on which the wheels of the car are driven and the turntables 6 on which the front wheels come to rest and are supported during the various tests. The turntables 6 are supported on base members 5, one at the forward end of each runway 1. The base members 5 have guideways on which slide the testing units proper. These units comprise the standards 4 carrying the testing mechanism that is manipulated into various positions relative to the front wheels during the tests for alignments.

It is thought that a clearer and better understanding of the several operations of checking the front wheels of automobiles for their alignment characteristics will be had by carrying through the routine necessary for each operation.

Proper alignment of the front wheels is largely dependent upon the general condition of the bearings and bushings of the entire front wheel assembly. All bushing and bearings must be free from excessive play before correct wheel alignment can be made. King-pin, tie rod joints and wheel bearings are all very important and cannot be neglected.

Wheels should be free from excessive wobble to prevent wobble wear. A wobble caused by looseness in the wheel bearings, bolts and bushings will result in spotty tire wear and prevent correct alignment or adjustment of the front assembly. All loose and worn wheel bearings, king-pin bushings, spring bolts and other bushings must be tested and corrected or replaced with new ones before any tests for alignment are undertaken. Front wheels should be checked for balance. A large out of balance condition will cause high speed shimmy and abnormal tire wear. A wobble of around one sixteenth of an inch is permissible on the rims, while tires usually run out slightly more. When checking from the sides of the tires the high spots should be chalked and then points selected for the checks that will give average conditions.

Considering now that the front assembly has been gone over carefully and all bearings tightened or replaced where necessary and other parts put in proper condition we can proceed with the operations of checking the wheels for the various alignments.

*Caster*

Caster should be checked first and with standard front axle construction should be corrected before any other corrections are made because it affects both "camber" and "toe-in". If "caster" is very nearly correct and the same on both sides of the car so that correction is considered unnecessary, the other checks may be proceeded with. In the pantograph type of knee action construction "camber" is corrected before "caster".

Referring to Figs. 2 and 3 the two positions of a front wheel for the determination of "caster", will be seen.

The amount in degrees that the front axle king-pin is tipped or tilted toward the rear of the car denotes "caster".

The "caster" angle of the king-pin is determined with the device disclosed in this application by measuring the difference in the inclination of the plane of the wheel for different angular steering positions.

The first operation in checking "caster" is to turn the wheel out to a twenty five degree angle as shown in Fig. 2 by aligning it with the raised line 8 on the base member 5. When the wheel is set to this angle place the contact bar 9 in a vertical position and contact the shoes 10 with the top and bottom sides of the tire. Now loosen the screw 12 and adjust the small "caster" scale 10a so the "caster" indication line 11 points to zero, then tighten the screw 12 to hold the scale in position.

Now slide the head of the aligning device laterally away from the tire and turn the tire to align with the twenty five degree mark 13 as shown in Fig. 3. Again contact the sides of the tire with the shoes 10 by moving the standard 4 toward the tire. The position assumed by the vertical bar 9 will swing the indicator arm 14 so the indicator mark 11 will register with a different scale line than it had in Fig. 2.

A visual inspection of the position along the "caster" scale 10a that the indicator registers, reading from the zero setting of Fig. 2 will indicate in degrees the "caster" of the wheel and axle king-pin. The same operation should be repeated to check and adjust the "caster" for the other front wheel. "Caster" must be alike on both front wheels or shimmy, wandering, road shock and excessive tire wear may be caused by unequal, excessive or negative "caster".

If after testing both front wheels it is found that the "caster" is either not correct or that it is different for the two front wheels, then the proper correction must be made, since "caster" must be correct for both front wheels before any of the other adjustments or checks can be made except as previously mentioned for knee-action assemblies.

If the car manufacturers' specifications cannot be found for the "caster" of any car under examination it will be found satisfactory to set the "caster" anywhere from ½ to 1½ degrees as these limits seem to give satisfactory steering that is usually free from shimmy. This is true only for standard axles, knee-action assemblies may require more definite or different angles.

Figure 4:
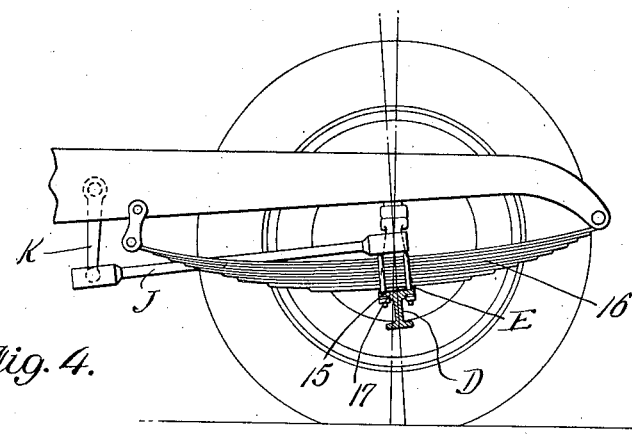
Figure 4 shows a section of the front end of a car with a shim under the springs to tilt the axle to give proper caster or in a position after increasing "caster".
Figure 5:
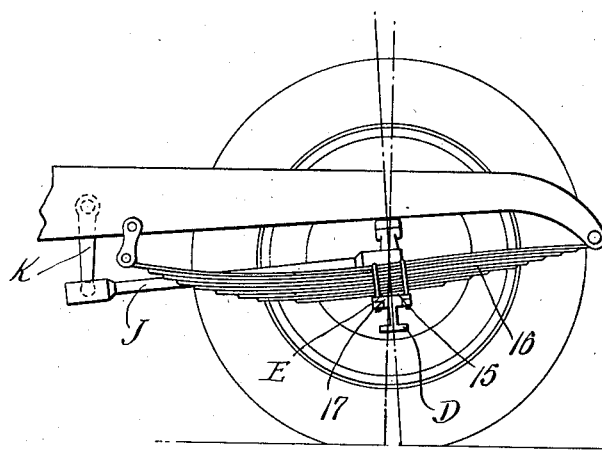
Figure 5 shows the same view as Figure 4 but shows the axle tilted in somewhat the opposite direction, which is exaggerated, to show a further decrease in "caster", the king-pin of course tilting with the axle in each instance.

Figures 4 and 5 show in an exaggerated manner the correcting of "caster" by tilting the axle and king-pins of the car. Figure 4 shows the manner of adjusting for increasing "caster" and Figure 5 shows the adjustment for decreasing "caster". It will be noted that the position of the "caster" adjustment is substantially the same in each view, but in Figure 4 the shim under the spring has the thick end at the back which has tilted the axle and king-pin forward to increase the "caster" while in Figure 5 the thick end of the shim is at the front which has had the effect of tilting the axle backward to decrease "caster". The reason for tilting the axle for the "caster" adjustment is that the king-pin is substantially at right angles to the spring saddle so that tilting the axle changes the angle of tilt of the king-pin accordingly. It is to be noted that the position of the front springs has changed slightly due to the tilting of the axle.

The tilting of the axle as noted is accomplished by placing tapered shims 15 between the under side of the spring 16 and the spring saddle 17, the shims coming in ¼, ½, 1, and 1½ degrees variation. If there is more than 1 to 1½ degrees difference in the "caster" reading from opposite ends of a front axle it will be necessary to twist the axle with a proper tool in order to bring the "caster" angle the same on both ends of the axle. The position of Figure 4 tilting the axle forward at the bottom and the king-pin backward at the top which has the effect of increasing "caster" while in Figure 5 the axle is tilted backward at the bottom and the king-pin forward at the top which has the effect of decreasing "caster".

Camber

"Camber" is the amount in degrees that the front wheels of an automobile are inclined outward at the top. Proper "camber" is often reduced and changed by axle sag, bearing play or king-pin or bushing clearance. The front wheels are set straight ahead in making a "camber" check. The cross bar 9 Figure 6 is set in a vertical position and the special "camber" checking contact shoe 18 is placed on the lower end so that the inclined face 19 will contact with the bulge of the tire occasioned by the weight of the car.

The lower end of the contact shoe 18 must rest on the turntable so that the inclined portion 19 will be properly located relative to the bulge on the tire occasioned by the weight of the car. "Camber" may be taken either from the sides of the tire or from the felloe and when taken from the felloe the felloe check extensions 21 of Fig. 19 are employed.

The "camber" on both front wheels must be the same. Either too much or too little will frequently cause tire wear and shimmy and especially with the larger balloon tires, tire wear is the greatest trouble.

Figure 6:
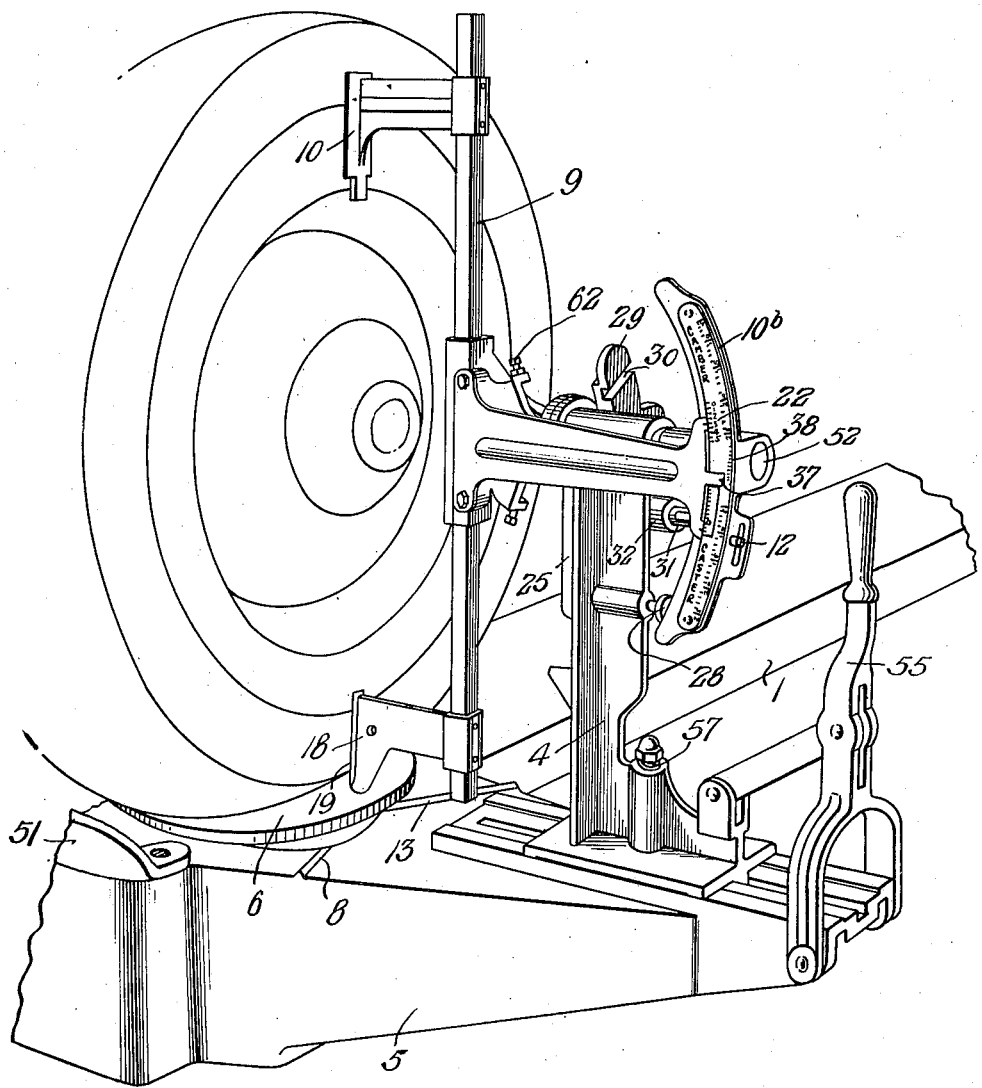
Figure 6 is a view similar to Figs. 2 and 3 but with the front wheel in the straight ahead position and showing the testing device set up to the wheel for the determination of "camber".

After the device has been adjusted to the tire or felloe to take a "camber" reading the degree of "camber" will be read from the scale 22 of Figure 6.

Present day automobile construction calls for a small amount of "camber", primarily to relieve the strain on the outer end of the short spindle and the outer bearing, also present construction provides a side inclination of the "king-pin" to help the front wheel steer about a pivot approximately under the load, so that ½ to 1 degree of "camber" is usually sufficient.

King-pin inclination

Figure 7:
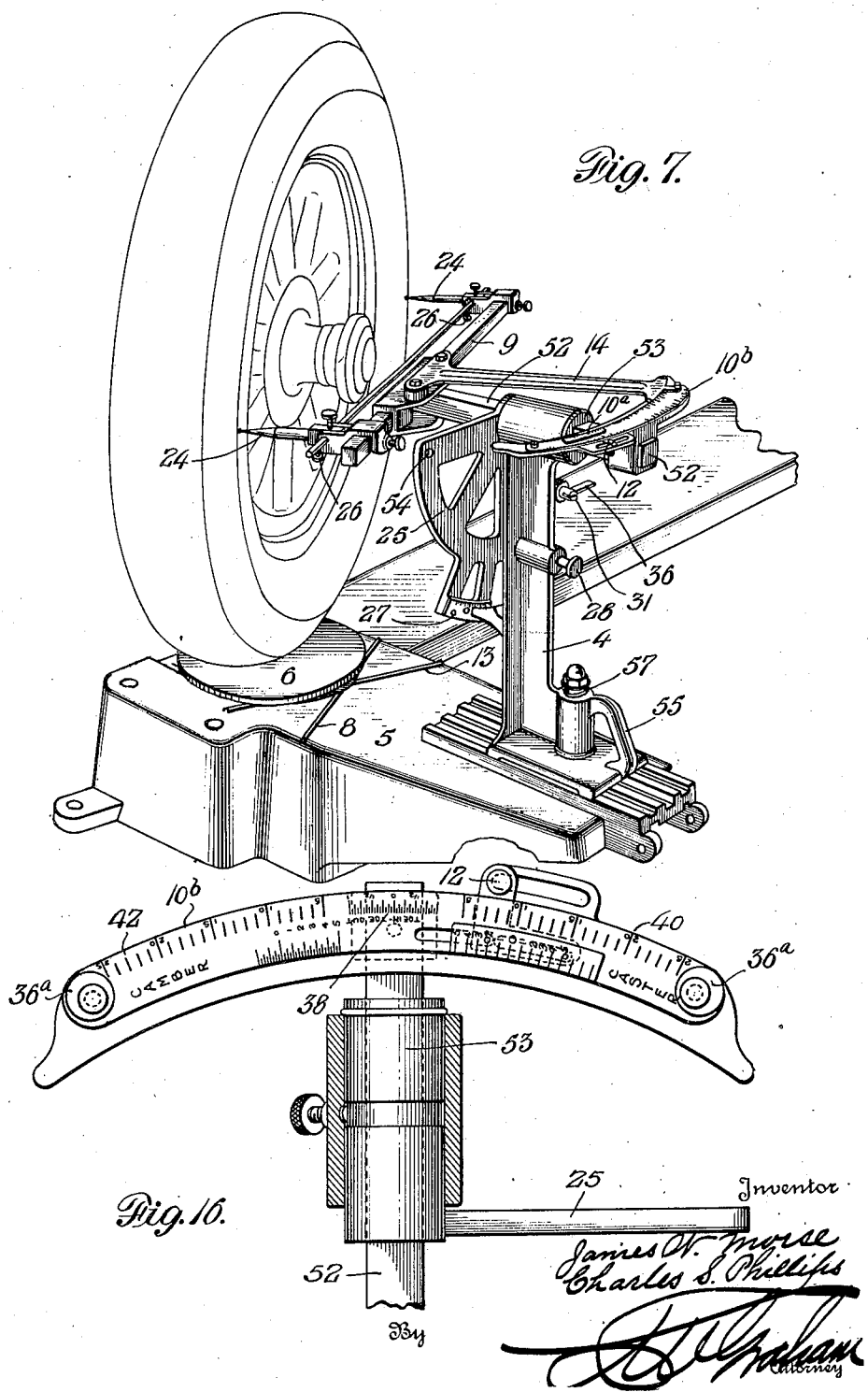
Figure 7 is an enlarged detail view showing the set up for the determination of "king-pin inclination", with the front wheel turned to the first testing position.
Figure 8:
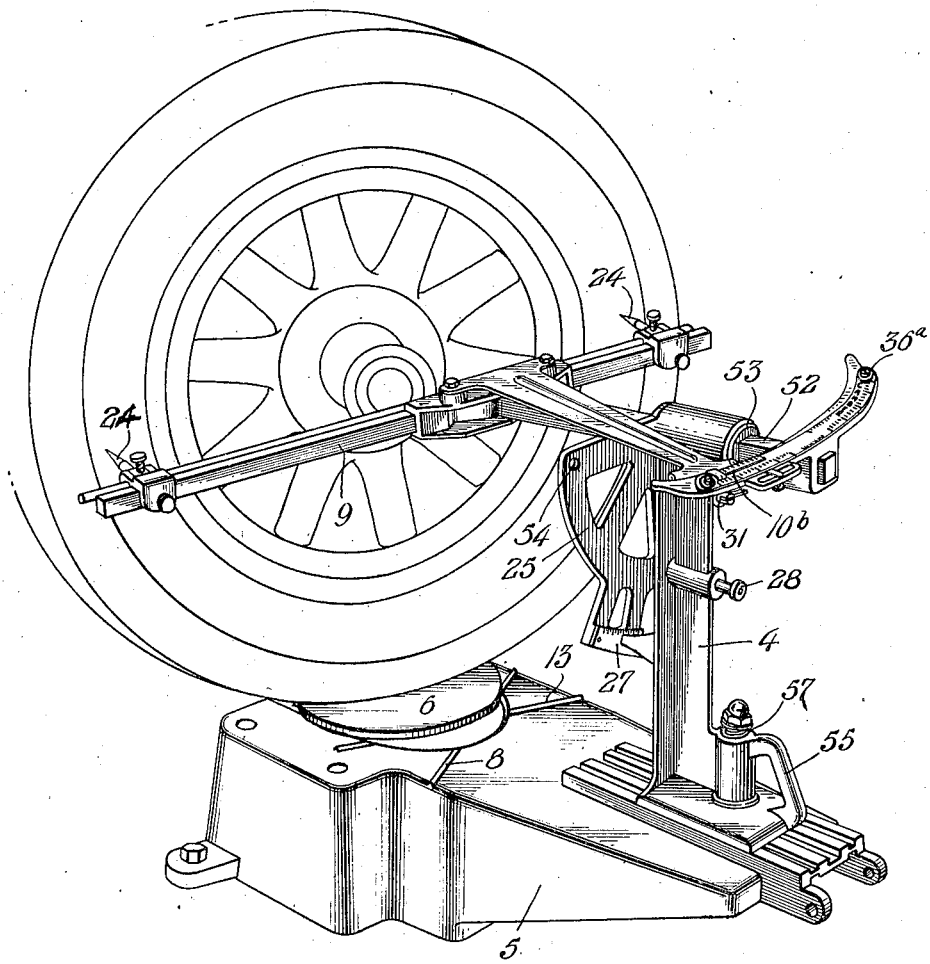
Figure 8 is a companion view to Figure 7 but showing the front wheel of the car in the position for second test wherein it is turned a stated number of degrees in the opposite position from Figure 7.

The operation for checking "king-pin inclination" is illustrated in Figures 7 and 8. In each of the extreme positions the wheels are set to the 25 degree limits of the scale on the outer edge of the scale plate in Figure 16 and to keep the wheels from rotating slightly on the wheel spindles during this test small clamps are preferably used on the brake drums, clamping them to the backing plate. On most cars the brakes will hold the wheels from rotation, and a pedal depresser is used to lock the brake, but on some others the small clamps are necessary.

After setting the front wheel to the 25 degree angle on the scale 10b as indicated on Figure 7, adjust the checking instrument to the side of the tire with the flattened end markers 24 adjusted along the bar 9 until they touch the tire sides at the highest points. Now slide instrument back and chalk the ends of the pointers and then move them up to the tire again to mark the two contact spots with a chalk line.

Now slide the entire unit away from the wheel and turn the wheel to the opposite 25 degree angle as shown in Figure 8. The king-pin inclination will change the vertical heights of the chalk marks when the wheel is swung to this position so that when the unit is again placed up so the pointers contact with the tire it will be necessary to swing the bar 9 and quadrant 25 in order to bring the ends of the pointers 24 parallel with the chalk marks on the tire, but in so doing the pointer 24 will lie below the marks. They may now be elevated by means of the thumb screws 26 until the points touch the chalk marks and at the same time swinging the bar 9 up or down slightly so both pointers align with the marks. When the above condition is reached the exact king-pin inclination can be read directly from the scale 27.

The stop pin 28 holds the quadrant and parts carried thereby in normal operative positions of vertical or horizontal, but this pin is withdrawn when taking king-pin inclination readings because of the necessity of swinging the bar 9 somewhat out of exact horizontal.

The adjustment of the instrument when checking "king-pin inclination" requires quite a delicate and accurate movement of the testing head and to facilitate this an added improvement has been provided as is illustrated in Figs. 11, 12, 13, and 14, these extra figures being provided because this device would not show well in Figs. 7 and 8.

An extension 29 has been placed on the quadrant 25 which carries an angular groove 30. A retractible adjusting member 31 is carried in a suitable housing 32 and is moved into engaging position by the compression spring 33. The head 34 carries an engaging pin 35 set eccentric to the axis of the pin 31. This eccentric pin 35 engages in the groove 30 when the cam lever 36 is swung outward to permit axial movement of the retractible member 31. With the eccentric pin 35 in the groove 30 it will be seen that a swinging of the cam lever will move the quadrant 25 micrometrically and permit of a very fine adjustment, and with the further advantage that the quadrant is automatically locked in the finally adjusted position so there is no danger of its moving easily while the reading of the scale 27 is being accomplished. The locking action is not positive but the friction of the parts are sufficient to hold the quadrant in the adjusted position without danger of being moved through ordinary handling of the unit.

In order to facilitate a quick setting of the wheels to the two opposite 25 degree adjustments, the screws 62 Figure 11 are provided and adjusted as stops for the swinging head. These screws may be used in place of the eccentrics 36a of Figure 16.

Toe-in

After "caster", "camber" and "king-pin inclination" have been checked and corrected the next step is to check and if necessary, correct "toe-in" at a straight ahead position. When we speak of "toe-in" adjustments or amount of "toe-in" in relation to "camber", it must be understood that there must not be any looseness or play in the tie rod connections.

"Toe-in" is an adjustment whereby the distance is less at the front of the wheels than at the back. The setting of the checking unit for testing "toe-in" would be as illustrated in Figure 1 with shoes like 10 of Figure 8 on opposite ends of the bar 9 and the bar 9 in a horizontal position. To check "toe-in" of the wheels the unit would be placed against either of the front wheels and the wheel moved until the indicator mark 37 on the arm 14 rests at zero on the scale 38, this wheel will then be pointing straight ahead. Now without touching or changing this side of the car go to the other side and adjust the unit to the wheel, this wheel will show "toe-in" and the indicator mark 37 will ride along the scale 38 and indicate in inches or fractions thereof the "toe-in" of the front wheels.

"Toe-in" must be adjusted in accordance with the amount of "camber." High "camber" requires high "toe-in", low "camber" requires low "toe-in." "Camber" and "toe-in" are closely related.

To correct "toe-out" or "toe-in" condition, is merely a matter of making adjustments that will change the length of the tie rod.

Final correction of "toe-in" by adjusting the tie rod length should not be made if "steering geometry" is off. It is, however, necessary to correct "toe-in" before "toe-out" can be corrected, so if "toe-in" is off, correct it, then make the "steering geometry" readings. If "toe-in" is badly out look for a bent steering arm.

Toe-out on curves or steering geometry

The importance of "steering geometry" can scarcely be over-emphasized when it is considered that fully 60 per cent of car travel is done with the front wheels turned more or less from a straight line. A car when properly aligned as to "caster", "camber" and "toe-in", front and rear wheels being parallel and front tires properly inflated, could run in a straight line without any difficulty and it would probably travel many thousands of miles on one pair of tires, while if one of the spindle arms was bent, which would not affect straight ahead driving, and the car was set to turn in a circle, it is quite possible that in a few hundred miles the tires would be worn completely through.

The position of the units for checking "toe-out" would be as shown in Figure 1, that is with the bar 9 in a horizontal position, and Figure 15 shows the relative positions of the front wheels with their axes projected to intercept the axial line of the rear wheels. This condition must prevail no matter how much or how little the front wheels may be turned from a straight ahead drive. The projected axes of the front wheels must intercept the axial line of the rear wheels at the same point somewhere in the distance.

In checking "toe-out" on the curve with the apparatus herein disclosed it is first necessary to determine the number of degrees "toe-out" required for the car's wheelbase. As an example we will assume the wheel base to be 126 inches.

Referring now to Figure 15 we will set the unit right up to wheel 39 and turn the wheel until the central indicator mark 37 reads 20 degrees on the scale of Figure 16 as at 40. The unit for the left wheel should now be set up to the wheel, when if the "toe-out" is correct for a wheel base of 126 inches, should show a reading of 23 degrees as at 42 of Figure 16.

The chart Figure 17 has been plotted to give the correct angle for the inside wheel for any wheel base from 100 to 170 inches when the outside wheel is set to 20 degrees for testing purposes. It will be seen that the curve line on the chart intercepts the vertical line 126 and the horizontal line 23 degrees.

In making the toe-out check if the reading for the inside wheel is more or less than it should be for the wheel base of the car it indicates that the right spindle arm is bent and should be replaced with a new one. Before making any changes or condemning the steering or plane arms be sure that the axle is not bent and that "caster", "camber" and "toe-in" are correct.

Having now passed through the various checks necessary to properly examine and correct the front wheel assembly of a car we can proceed with a description of other details of this improved apparatus that will help to gain more accurate determinations than heretofore and will save the operators much time and annoyance and give the car owner a much better job of aligning.

Figure 9:
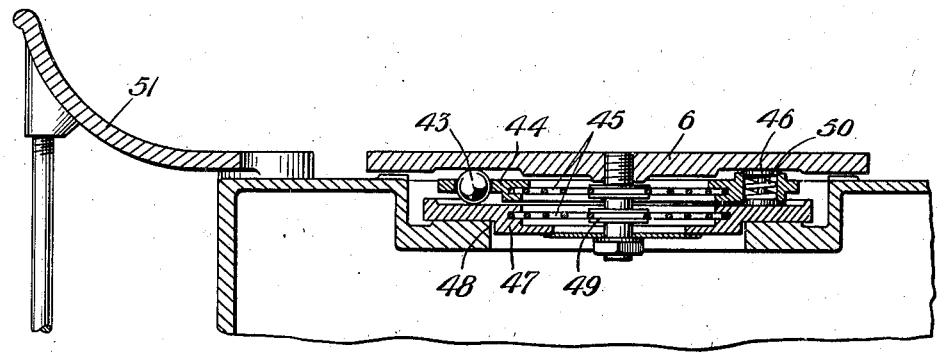
Figure 9 is a cross sectional detail of the front end of one of the wheel supports and the base member therefor, and is taken on substantially the line 9—9 on Fig. 10.
Figure 10:
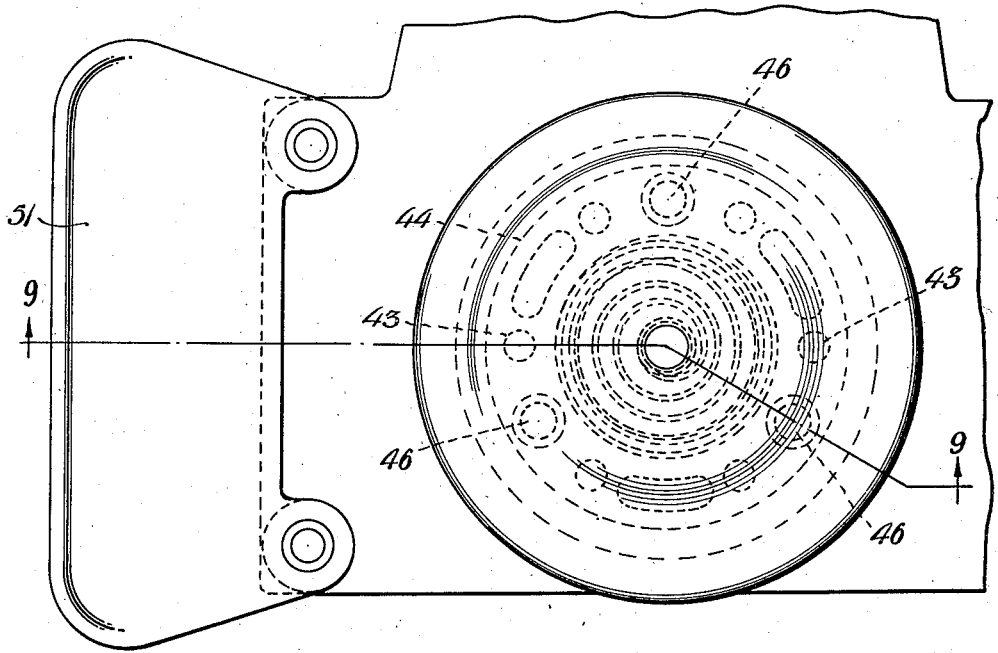
Figure 10 is a plan of the same end and portion of the front end of the wheel support as Figure 9.

The mounting for the turntable 6 has been improved by making the tables universally movable in all directions without binding the wheels. It was found in practice that when turning the front wheels with the weight of the car on the tires that the tables 6 should have more freedom of movement than heretofore. Figs. 9 and 10 show the new construction clearly.

The turntable 6 normally rests on the ball bearings 43 carried by the retainer plate 44, the balls rolling on the bearing plate 47. It will be seen that the turntable 6, the retainer plate 44 carrying the balls 43 may move freely in any direction on account of the clearance provided around these parts.

The bearing plate 47 is held substantially central by the shoulder 48, but the other parts of the assembly may move freely in any lateral direction required. The plate 6 and the plate 44 are held in a normal central position by the flat spiral springs 45, the lower ends of which engage the hub 49 and the outer ends find engagement in the retainer plate 44 and the bearing plate 47.

In order to prevent the turntable having a too free movement a dampening effect is inserted in the assembly by means of friction plugs 46 which comprise disks bearing against the under sides of the turntable 6 and the top side of the bearing plate 47 and pressed into contact therewith by the small coiled springs 50. Three of the friction buttons are provided as indicated in Fig. 10 which gives a balanced damping effect.

There is also provided on the front end of the runway an improved wheel stop to prevent the car from running too far forward when driven onto the runways as at 51, this stop, however, does not contact with the wheel during the various checks for alignment etc.

Two different constructions are shown for the head mounting of the testing unit. Fig. 1 shows the preferred construction wherein the bar 52 is round and has no axial movement relative to the unit standard. It is mounted in a rotating bushing 53. The quadrant 25 is securely fastened to this rod and moves with it when rotated. Lateral movement of the standard 4 toward and away from the wheels is along the base 5 by means of the hand hold 55, sufficient frictional contact with the base is had through the spring 57 pressing the standard 4 firmly to the base. The friction thus produced is sufficient to hold the unit in any desired adjustment along the base without the manipulation of fastening devices.

Figure 20 shows a preferred way of giving a frictional drag to the bar 9 when moved through the head member, by means of the buttons 60 pressed against the bar 9 by the flat spring 59. The frictional drag thus set up is sufficient to hold the bar in any desired position and still permit it to move freely when the operator desires to move it.

In the foregoing description the adjustment of the front wheels to the 25 degree angles for certain tests have been described as being set to the raised lines 8 on the base member 5. Figs. 11 and 13 show a modified manner of adjusting the wheels quickly to the desired angle and show means for giving the final fine adjustment to this setting in both directions.

Referring to Fig. 11 will be found set screws 62 which are adjusted at the factory and locked so as to form stops against which the swinging head of the unit contacts when swung to the limits of movement and thus automatically sets the head to the desired 25 degree angles in both positions. This makes the adjustment both rapid and accurate and saves much time in checking where this angle is used.

In setting the head member so that the test bar 9 is in either the vertical or horizontal, or any intermediate positions, it is desirable that means be provided to hold the indicator arm 14 in any of the desired positions or adjustment without the need of clamping devices. Such an arrangement is disclosed in Figs. 11 and 13 where 64 represents an extension overlying the frame and under which is positioned a friction plug made of fibre or other suitable material as at 65 and which is normally held in frictional engagement with the underside of the arm extension 64 by means of the spring 66, which may be adjusted for tension by the screw 67. By placing the proper tension on the spring 66 the fibre or other plug 65 will bear against the extension arm 64 with sufficient friction to hold the indicator arm 14 in any adjustment along the scale member Fig. 16 so that when a test is being made the indicator on the scale will find its proper position and the friction plug 64 will hold it in that position for observation by the operator without the necessity of clamping devices. Another reason for holding the bar 9 in any position adjusted is to keep it from swinging around and striking the fenders when the car is driven on or off the runways.

Applicants wish to mention that the apparatus of this application is particularly adapted to checking the alignments of wheels mounted on the new knee action assemblies, but that the manner of making corrections to the wheel alignments is differently carried out.

Figure 21:
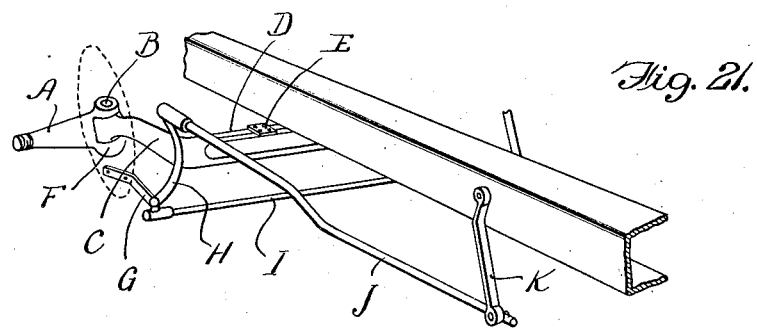
Figure 21 is a diagrammatic view indicating the various parts of the front end of an automobile that come in for attention in making the various checks and tests.

Figure 21 was made to show a front end assembly of the standard type in which the various parts are lettered and the technical names thereof given for the information and guidance of the reader and to render a more clear and distinct use of the terms used throughout the specification and claims.

A—is the wheel spindle.
B—is the king-pin.
C—is the axle end.
D—is the axle.
E—is the spring platform of saddle.
F—is the spindle body or yoke.
G—is the spindle plane arm.
H—is the steering arm.
I—is the tie rod.
J—is the drag link.
K—is the pitman arm.

What we claim as new and desire to secure by Letters Patent is:

1. An apparatus for checking and testing the alignment characteristics of automobile wheels comprising base members, runways leading to said base members, turntables on said base members to form supports for front automobile wheels, standards on said base members mounted for movement toward and away from the sides of said front wheels, a horizontal rotatable member in the top of each of said standards, arcuate scale members mounted on the outer ends of said rotatable members and fixed thereto, hub members mounted on the inner ends of said rotatable members and lying in substantially the same planes as said scale members, pointing indicators secured to said hub members and extending back across said standards and cooperating with said scale members, cross bars mounted for axial movement in said hub members, shoes mounted on said cross bars to contact with the sides of the tires on said front wheels, means for holding said standards on said base members in any desired adjustment by frictional contact, said scale members being graduated to give readings in degrees for camber and caster and inches for toe-in.

2. An apparatus for checking and testing the alignment characteristics of automobile wheels comprising base members, turntables on said base members to form direct supports for front automobile wheels, standards on said base members, means for holding said standards to said base members by frictional contact, a horizontal rotatable member in the top of each standard, arcuate scale members mounted on the outer ends of said rotatable members and fixed thereto, hub members mounted on the inner ends of said rotatable members, pointing indicators secured to said hub members and extending back across said standards and cooperating with said scale members, a quadrant secured to said rotatable member to move therewith, cross bars in said hub members and shoes for contacting with said wheels, said scale members being graduated to give readings in degrees for camber and caster and inches for toe-in and said quadrant graduated to give readings in degrees for king pin inclination.

3. An apparatus for checking and testing the alignment characteristics of automobile wheels comprising a unitary device complete for checking camber, caster, toe-in, king-pin inclination and toe-out by direct reading scales and without calculations, including a base plate, a movable standard on said base plate, a rotatable member on said standard, said rotatable member supporting a member for contacting with a wheel and carrying graduated scales and a movable pointer for giving direct readings for camber, caster, toe-in and toe-out, said rotatable member also carrying a movable quadrant, means on said standard for positioning said quadrant, rotatable member and wheel contacting member in proper operative relation with a wheel to give a direct reading of king-pin inclination in degrees.

4. An apparatus for checking the caster of automobile wheels comprising a checking unit supported on a base and movable toward and away from a front automobile wheel, a caster scale reading in degrees carried by said unit, means for adjusting said scale to zero when said unit is adjusted to the first operation for determining caster to thereby give the caster reading in degrees when the said unit is set for the second operation of caster determination.

5. An apparatus for checking the alignment characteristics of automobile wheels comprising a unitary device movable toward and away from the front wheels of an automobile, a base for supporting said device, a quadrant carried by said device and rotatable relatively thereto and carrying a scale for giving a direct reading of king-pin inclination and a fixed pointer coacting with said scale and means attachable to said quadrant at will for giving a micrometric adjustment thereof when making king-pin inclination determinations.

6. An apparatus for checking the alignment characteristics of automobile wheels comprising a unitary device movable toward and away from the front wheels of an automobile, a quadrant carried by said device carrying a scale for giving a direct reading of king-pin inclination, a test bar and contacts carried by said device for contacting a tire and marking the sides thereof in the first operation of determining king-pin inclination, means on said test bar for elevating or lowering said contact points to properly align them for the second operation of king-pin inclination determination.

7. An apparatus for checking the alignment characteristics of automobile wheels comprising a unitary device movable toward and away from the front wheels of an automobile, a testing head carried by said device rotatable to assume various angular positions relative to the side of an automobile wheel, contact shoes to rest against the sides of the tire when in a vertical position, one of said shoes having an inclined face to compensate for the bulge of the tire at the ground line due to the car weight.

8. An apparatus for checking the alignment characteristics of automobile wheels including supporting means, a cross bar rotatably and slidably carried by said supporting means and carrying contact members to contact with the side of a wheel, a spring weighted means forming a constantly yielding device bearing against said cross bar for frictionally holding said bar in any adjusted position whether vertical or any other angle relative to horizontal.

9. An apparatus for testing the alignment characteristics of automobile wheels comprising a unit for placement relative to an automobile wheel, an arm carrying a scale plate having graduations for giving a direct reading in degrees for caster, said caster scale plate being adjustable to zero when taking a first position reading for caster to thereby give a direct reading when in second position operation for determining caster.

10. An apparatus for checking the alignment characteristics of automobile wheels comprising a base member, a standard slidable on said base member, a rotary element carried by said standard, a bar slidable in said rotary element in the same direction as the movement of said standard along said base member, a plurality of direct reading scales for reading camber, caster, toe-in and toe-out carried on one end of said bar, a cross bar carried on the other end of said first bar and movable at right angles to said first bar and carrying shoes for contacting with the sides of wheels for determining the alignments thereof, an indicator arm bridging the space between said cross bar and said scales for indicating on said scales the determinations found by said cross bar when contacting with the sides of a wheel.

11. An apparatus for checking the alignment characteristics of automobile wheels comprising an adjustable wheel engaging device including an indicator arm and a scale associated therewith, and a spring weighted device bearing against said arm for frictionally holding said arm in any adjusted position relative to said scale whether said arm is vertical or in any other position.

12. An apparatus for checking an alignment characteristic of dirigible wheels comprising a rotatably mounted cross bar, a pair of contact elements operatively carried by the bar for contacting with the sides of the wheel, adjustable means for elevating the wheel contacting portions of said elements relative to said bar for alignment with reference marks carried by the wheel, and means for gauging the rotative adjustment of said cross bar to indicate the said alignment characteristic of the wheel when said contacts have been finally adjusted thereto.

13. An apparatus for checking the king-pin inclination of dirigible vehicle wheels comprising a support, a gauge arm carried by said support for rotation about a horizontal axis, a pair of wheel engaging fingers mounted on said gauge arm, said fingers being adjustable for rocking movement about said arm, and means associated with said gauge arm for indicating rotative adjustments thereof to determine the king-pin inclination.

14. In a testing apparatus for determining the caster of a dirigible wheel, a testing unit including a support, a wheel contacting member pivotally carried by said support for angular movement in a vertical plane, means for determining the angular movement of said member with relation to said support, and means for adjusting said determining means to zero reading when said member is adjusted to a first testing position in order that a direct caster determination may be had when the unit is placed in its second testing position.

15. In an apparatus for determining the camber of a dirigible wheel, a testing unit, a wheel contacting member operatively mounted in the unit for angular movement in a vertical plane, and a tire contacting shoe carried by said member and arranged to register with the supporting plane of the tire during the test and to have a tire contacting face inclined vertically to compensate for the bulge formed in the tire due to the weight supported by the tire.

16. In a testing apparatus for determining king-pin inclination of a dirigible wheel, a testing head, a wheel contacting member mounted in the head for horizontal pivotal movement and arranged to be utilized for establishing a plane of reference when the wheel is set at one steering angle, micrometric means for angularly adjusting the wheel contacting member in a vertical plane to bring said member into parallel relation with said plane of reference after the wheel has been swung through a predetermined steering angle, and means for determining the angular adjustment of said member to determine the king-pin inclination of the wheel.

17. In an apparatus for checking an alignment characteristic of dirigible vehicle wheels, a testing unit including supporting means, a wheel engaging member carried by said supporting means for rotative adjustment relative thereto, means associated with said wheel engaging member for effecting micrometric rotative adjustment thereof, and means for gauging the rotative adjustment of said wheel engaging member to indicate said alignment characteristic of the wheel.

18. A method of determining the king-pin inclination of a dirigible wheel, including the steps of locking the wheel against rotation and swinging said wheel to a selected steering angle; then establishing a medium of reference upon the wheel in the zone of the horizontal medial portion of the wheel while so angled; then swinging the wheel through a predetermined steering angle; and measuring the angular displacement of the medium of reference to ascertain the king-pin inclination.

19. A method of determining king-pin inclination of a dirigible wheel, including the following steps: first, establishing a medium of reference upon the wheel; second, swinging the wheel through a predetermined steering angle; and third, measuring the angular displacement of the medium of reference to ascertain the king-pin inclination.

20. An apparatus for checking the alignment characteristics of automobile wheels comprising a unitary device movable toward and away from a front automobile wheel, a base for supporting said device, a swinging member and a scale carried by said device and a pointer coacting with said scale to give a direct reading of king-pin inclination, and means contacting with said swinging member at will for giving a micrometric adjustment thereto.

21. An apparatus for checking the alignment characteristics of automobile wheels comprising a base member, a standard slidable on said base member, a bar mounted for rotation in said standard and for sliding movement therein in the same direction as the movement of said standard along said base member, a scale plate for giving direct readings of camber, caster, toe-in and toe-out carried by said sliding bar, a test bar carried by said slidable bar and pivoted thereto, indicating fingers on said test bar for contacting with the side of a wheel for determining alignments thereof, an indicator pointer arm carried by said test bar and bridging the space between said test bar and said scale plate for indicating on said scale plate the determinations found when contacting said indicating fingers with the side of a wheel.

22. An apparatus for checking the alignment characteristics of an automobile wheel comprising a unitary device complete for checking camber, caster, king-pin inclination, toe-in and toe-out, a scale plate having graduations thereon and a movable pointer for giving direct reading results without calculation of the conditions, a test bar, movable contact members carried by said test bar for contacting the side of a wheel, a constantly yielding device incapable of holding said bar against movement but frictionally holding said bar in any adjusted position whether vertical or any other angle relative to horizontal.

23. An apparatus for checking king-pin inclination of automobile wheels comprising a support, a standard movable along said support toward and away from an automobile wheel, a bearing bar carried by said standard, a scale plate and pointer associated with said standard and bearing bar for giving direct readings of king-pin inclination, a test bar carried on the inner end of said bearing bar and normally resting in a horizontal position, movable contact members carried by said test bar for contacting with the side of an automobile wheel and placing marks thereon when said wheel is set to first position for checking king-pin inclination, pivot means permitting said test bar to swing from its normal horizontal position through a vertical plane until the said movable contact members carried thereby are positioned parallel with the marks on said wheel when it is set to second position for checking king-pin inclination, the said pointer then indicating a direct reading of king-pin inclination on said scale plate.

24. An apparatus for testing alignment characteristics of dirigible vehicle wheels, a testing unit comprising an upright supporting standard, a bearing carried by said standard, a horizontally disposed shaft mounted in said bearing and rotatably adjustable therein, a test arm pivotally mounted on said shaft, a pointer associated with said test arm and extending rearwardly therefrom in spaced relation to said shaft to clear said bearing, and a scale mounted for cooperation with said pointer to indicate angular adjustment of said test arm about its pivot.

25. A method of determining king-pin inclination of automobile wheels consisting in placing a front wheel in first and second positions of equal degrees on both sides of a straight ahead position, swinging the wheel to first position and placing horizontally aligned marks on the side thereof, swinging the wheel to second position and measuring the changed positions of said marks relative to their horizontal position when placed on the wheel, the said difference or angular displacement of said marks being indicated by a suitable scale and pointer to give a direct reading in degrees for king-pin inclination.

26. The method of determining the king-pin inclination of a steering assembly for a dirigible vehicle wheel including the steps of swinging said assembly about its king-pin through a predetermined steering angle and measuring the resulting angular displacement of a selected reference point carried by said assembly for ascertaining thereby the inclination of its king pin.

27. A method of determining king pin inclination of a dirigible wheel including the steps of marking the side of the wheel to establish a medium of reference thereon, swinging the wheel through a predetermined steering angle and measuring the angular displacement of the reference marking to ascertain the king pin inclination.

28. A method of determining king pin inclination of a dirigible wheel including the steps of marking the face of the wheel on opposite sides thereof to establish a line of reference therethrough, swinging the wheel through a predetermined steering angle and measuring the angular displacement of the reference line to ascertain the king pin inclination.

29. In an apparatus for checking an alignment characteristic of dirigible vehicle wheels, a testing unit including supporting means, a wheel engaging member carried by said supporting means for rotative adjustment relative thereto, means associated with said wheel engaging member for effecting micrometric rotative adjustment thereof, and means for gauging the rotative adjustment of said wheel engaging member to indicate the said alignment characteristic of the wheel.

30. In an apparatus for checking an alignment condition of dirigible vehicle wheels, a testing unit including a support, a gauge member carried thereby for angular adjustment to conform to the plane of a wheel to be tested, a scale and indicator means associated with said gauge member for indicating said alignment condition, and means providing for relative adjustment between said scale and indicator means to enable a zero indicating setting to be made when the gauge member is applied to a wheel when said wheel is positioned in an initial testing position, whereby said alignment condition of the wheel is directly indicated on the scale when the gauge member is shifted to conform with a second selected position of the wheel.

31. In an apparatus for testing alignment characteristics of dirigible vehicle wheels, a testing unit comprising an upright supporting standard, a horizontally disposed shaft carried by said standard, a test arm pivotally mounted on said shaft, a scale mounted to overlie said shaft rearwardly of the pivotal connection between said shaft and test arm, and a pointer associated with said test arm and extending rearwardly therefrom for cooperation with said scale to indicate angular adjustment of said test arm about its pivot.

32. An apparatus for checking the king pin inclination of dirigible vehicle wheels, comprising a support, a gauge arm carried by said support for rotation about a horizontal axis, a pair of wheel engaging fingers mounted on said gauge arm, unitary adjusting means for simultaneously rocking said fingers into selected positions of adjustment, and means associated with said gauge arm for indicating rotative adjustment thereof to determine the king pin inclination.

JAMES W. MORSE.
CHARLES S. PHILLIPS.